United States Patent
Wilson

(10) Patent No.: US 7,636,589 B2
(45) Date of Patent: Dec. 22, 2009

(54) CASING FOR AN ELECTRONIC DEVICE

(75) Inventor: Simon Wilson, Reading (GB)

(73) Assignee: Nokia Corporation, Espoo (FI)

( * ) Notice: Subject to any disclaimer, the term of this patent is extended or adjusted under 35 U.S.C. 154(b) by 1461 days.

(21) Appl. No.: 10/739,856

(22) Filed: Dec. 18, 2003

(65) Prior Publication Data

US 2005/0140255 A1  Jun. 30, 2005

(30) Foreign Application Priority Data

Dec. 16, 2003  (GB)  .................................. 0329078

(51) Int. Cl.
  *G06F 15/00* (2006.01)
(52) U.S. Cl. .................. 455/575.1; 455/90.1
(58) Field of Classification Search ............ 455/575.1, 455/90.1–90.3; 264/525, 532
  See application file for complete search history.

(56) References Cited

U.S. PATENT DOCUMENTS

| 3,292,749 A | 12/1966 | Reading | ..................... 190/56 |
| 3,424,623 A | 1/1969 | Oakley et al. | ............... 136/176 |
| 4,396,562 A | 8/1983 | Heaume | ..................... 264/23 |
| 4,673,363 A | 6/1987 | Hudson et al. | .................. 441/1 |
| 6,152,317 A | 11/2000 | Newby, Sr. | ................ 220/4.22 |
| 6,495,089 B1 | 12/2002 | Crider | ......................... 264/531 |
| 2003/0150699 A1 | 8/2003 | Song et al. | .................. 200/5 A |

FOREIGN PATENT DOCUMENTS

| EP | 0 737 562 A3 | 10/1996 |
| EP | 1 066 949 A1 | 1/2001 |
| EP | 1 301 011 A2 | 4/2003 |
| EP | 1 301 013 A1 | 4/2003 |
| GB | 2 288 142 A | 10/1995 |
| GB | 2367531 A | 4/2002 |
| GB | 2 380 702 A | 4/2003 |
| JP | 6047833 A | 2/1994 |
| WO | WO 01/99481 A2 | 12/2001 |
| WO | WO-02/03828 A1 | 1/2002 |

OTHER PUBLICATIONS

Database WPI, Section PQ, Week 200334, Derwent Publications Ltd., London, GB; AN 2001-438432, XP002323237, Nov. 23, 2002, 1 pg.
Patent Abstracts of Japan; "Portable Terminal"; Kyowa Kk; Pub. No. JP2001156669 A; Pub. Date Jun. 8, 2001.
Patent Abstracts of Japan; "Portable Radio Telephone Set"; Canon Kk; Pub. No. JP7288567 A, Pub. Date Oct. 31, 1995.
WPI Abstract Accession No. 2001-438432; KR2001000913 A; Kwang Mo Kil; Pub. Date Jan. 5, 2001.

*Primary Examiner*—Sam Bhattacharya
(74) *Attorney, Agent, or Firm*—Harrington & Smith, PC

(57) ABSTRACT

A casing for a mobile electronic device, the mobile electronic device having a display and a user-actuable input device, the casing comprising at least two shells configured to be sealedly interconnected with each other so as to enclose an interior volume for receiving the mobile electronic device, at least one of the shells having a plurality of keypads integral with the remainder of that shell for actuation of the interface and at least one of the shells having a transparent window integral with the remainder of that shell for permitting the display to be viewed through the casing.

40 Claims, 4 Drawing Sheets

CASING FOR AN ELECTRONIC DEVICE

FIELD OF THE INVENTION

The present invention relates to a casing for a portable device such as a mobile communication station, most preferably a mobile phone. Such a casing is capable of providing a degree of resistance to ingress of water to the device and allows a greater flexibility in the design of features.

BACKGROUND OF THE INVENTION

Conventionally, casings for mobile stations are manufactured by injection moulding two casing shells, which are then joined by a mechanical attachment method, for example by clips. The join between the two casings typically extends around the perimeter of the mobile station and is vulnerable to water ingress. At least one of the casing shells typically has holes through which keys can project and over which a display window can be fitted. Mobile stations are hence also vulnerable at the seals between the plurality of keypads and the casing and the display window and the casing. The seepage of water into a mobile station can cause reliability problems.

Existing solutions for improving the resistance of mobile stations to water ingress are expensive and complex, generally requiring many sealing gaskets or welding between the casing shells. Welding the casing shells together also makes it difficult to service the mobile station if it later has to be repaired. Therefore, there is a need to provide a simple and inexpensive method for improving the water resistance of mobile stations.

SUMMARY OF THE INVENTION

The inventor of the present invention has noted that the casing shells for mobile stations typically each define a major face of the mobile station. This assists assembly of the mobile station since the internal components can readily be placed on one of the casing shells, and the other placed on top to complete the enclosure. However, since the casing shells meet around the periphery of the major faces the length of the join between the casing shells is relatively long.

Another issue is that the moulds required for injection-moulding impose limitations on the shape of convention injection-moulded casings. For example, where a conventional casing is formed so as to partially enclose a volume, the mould body that defines the interior form of the volume must be capable of being released from the casing once it has been formed. This makes it difficult, if not impossible, to form some types of features.

One aim of embodiments of the present invention is to provide an improved casing for a mobile station that inhibit water ingress. Another aim of embodiments of the present invention is to permit greater flexibility in the design of features (especially interior features) of mobile phone casings.

According to the present invention there is provided a casing for a mobile electronic device, the mobile electronic device having a display and a user-actuable input device, the casing comprising at least two shells configured to be sealedly interconnected with each other so as to enclose an interior volume for receiving the mobile electronic device, at least one of the shells having a plurality of keypads integral with the remainder of that shell for actuation of the interface and at least one of the shells having a transparent window integral with the remainder of that shell for permitting the display to be viewed through the casing.

The keypads may be touch-sensitive for actuation of the input device.

The casing may be elongate about an axis. Then the shells may be configured so as to be sealedly interconnected at an interface substantially perpendicular to that axis. If the casing comprises three shells the shells may be configured so that one of the shells may be sealedly interconnected to both of the other shells at respective interfaces substantially perpendicular to the said axis. If the casing comprises three shells, one of them may be elongate and have two opposite ends that are open, for example in the general form of a tube. The other shells may then form end caps for that shell. The keypads and/or window are preferably formed in that shell.

The user-actuable input device may comprise a plurality of key switches, which are movable with respect to the remainder of the shell with which the keypads are integral for engagement with and actuation of the key switches.

The mobile electronic device may have two major faces and at least one shell of the casing may have the form of a sheath capable of casinging substantially all of the two major faces of the mobile electronic device. At least one shell of the casing may form a lid portion for enclosing the mobile electronic device and incorporate substantially all of a minor face of the device.

The shells may be connected by means of a hinge.

At least one of the shells may comprise a gasket whereby the shells may be sealedly connected.

According to one embodiment, the keypads are connected to the remainder of the shell with which the keypads are integral by flexible webs permitting relative movement between the keypads and the remainder of the shell.

The keypads may be formed as an integral part of the casing with which the keypads are integral by a process of co-moulding. Where the casing with which the window is integral is not formed by blow moulding, the window may also be formed as an integral part of that casing by a process of co-moulding.

Each shell may be impermeable to water.

The mobile electronic device may comprise electrical components.

The casing is preferably suitable for enclosing a mobile electronic device engine, for example an engine having no protective surrounding housing. To that end the casing as a whole is preferably structurally rigid and/or non-pliable.

The display may be configurable under the control of a controller to present to a user of the mobile electronic device information concerning the status of the mobile electronic device.

The casing might be cooperatively configured to the engine of the mobile electronic device, such that the casing can hold the mobile electronic device in a fixed location relative to the casing when the mobile electronic device is inserted into the casing with the plurality of keypads lying adjacent to respective portions of the user-actuable input device when the mobile electronic device is enclosed within the casing.

The casing may have an opening for accepting an electrical charging connector. The mobile electronic device may be such as to be capable of being charged by means of a field passing through the body of the casing.

The mobile electronic device may be a mobile telephone.

The casing may be blow-moulded.

According to the present invention there is provided a method for forming a casing for a mobile electronic device, the method comprising forming the casing by blow moulding.

The method may comprise slitting the casing to form an opening therein, inserting the mobile electronic device through the opening and closing the opening.

The step of slitting the casing may comprise slitting the casing into two separate shells, and the step of closing the opening comprises re-engaging the shells with each other around the opening.

The step of slitting the casing may comprise slitting the casing into two shells that are joined by a web of material integral with the shells that constitutes a hinge whereby one shell may be hinged relative to the other.

The casing may comprise one or more protrusions that extend into the interior of the casing.

The casing may comprise a plurality of keypads integral with casing for actuation of a user interface of the device, and each keypad may have a protrusion that extends into the interior of the device for engaging the user interface.

The casing may be formed as a unitary component, having features that, once parts of the casing each carrying at least one such feature have been separated from each other, may be interlocked.

The casing may comprise an interlocking formation whereby the shells may be snap fastened together, the interlocking formation including at least a first wall borne by one of the shells and that extends into the interior of the casing, and at least a second wall borne by the other of the shells and that extends towards the exterior of the casing for bearing against the first wall when the shells are snap fastened together so as to resist detachment of the shells from one another.

At least one of the shells may comprise a third wall sloped so as to cause the first wall to be urged outwardly of the second wall on pushing of the shells together.

According to the present invention there is provided a casing for a mobile electronic device comprising at least two shells configured to be sealedly interconnected with each other so as to enclose an interior volume and wherein the shells are comprised of walls having a substantially uniform thickness and protruding portions, at least some of said protruding portions projecting from the walls into the interior volume.

The protruding portions of the casing may be arranged for actuation of a user-actuable input device of the mobile electronic device.

The shells may be snap fastened together by means of the interengagement of at least one of the protruding portions of one shell with a corresponding formation of the other shell.

According to the present invention there is provided a preform for a casing for a mobile electronic device, the preform comprising a unitary component having features that, once parts of the component each carrying at least one such feature have been separated from each other, may be interlocked. The preform may be formed by blow moulding.

The preform may be capable of being slit so as to separate the said parts from each other.

The said parts may each be capable of constituting a shell configured to be sealedly interconnected with the other such shell so as to enclose an interior volume for receiving the mobile electronic device, at least one of the shells having a plurality of keypads integral with the remainder of that shell for actuation of the interface and at least one of the shells having a transparent window integral with the remainder of that shell for permitting the display to be viewed through the casing.

The component may be elongate about an axis and the parts may be capable of being separated from each other along an interface substantially perpendicular to that axis.

According to the present invention there is provided a mould for forming such a preform.

BRIEF DESCRIPTION OF THE DRAWINGS

The present invention will now be described by way of example, with reference to the following drawings in which.

DETAIL DESCRIPTION OF THE INVENTION

Typically, a mobile station such as a mobile phone has a casing and a body portion. The body portion carries the operational components of the mobile station, including the engine. The engine preferably performs the processing or (where present) communication functions of the mobile station.

Figure 1:
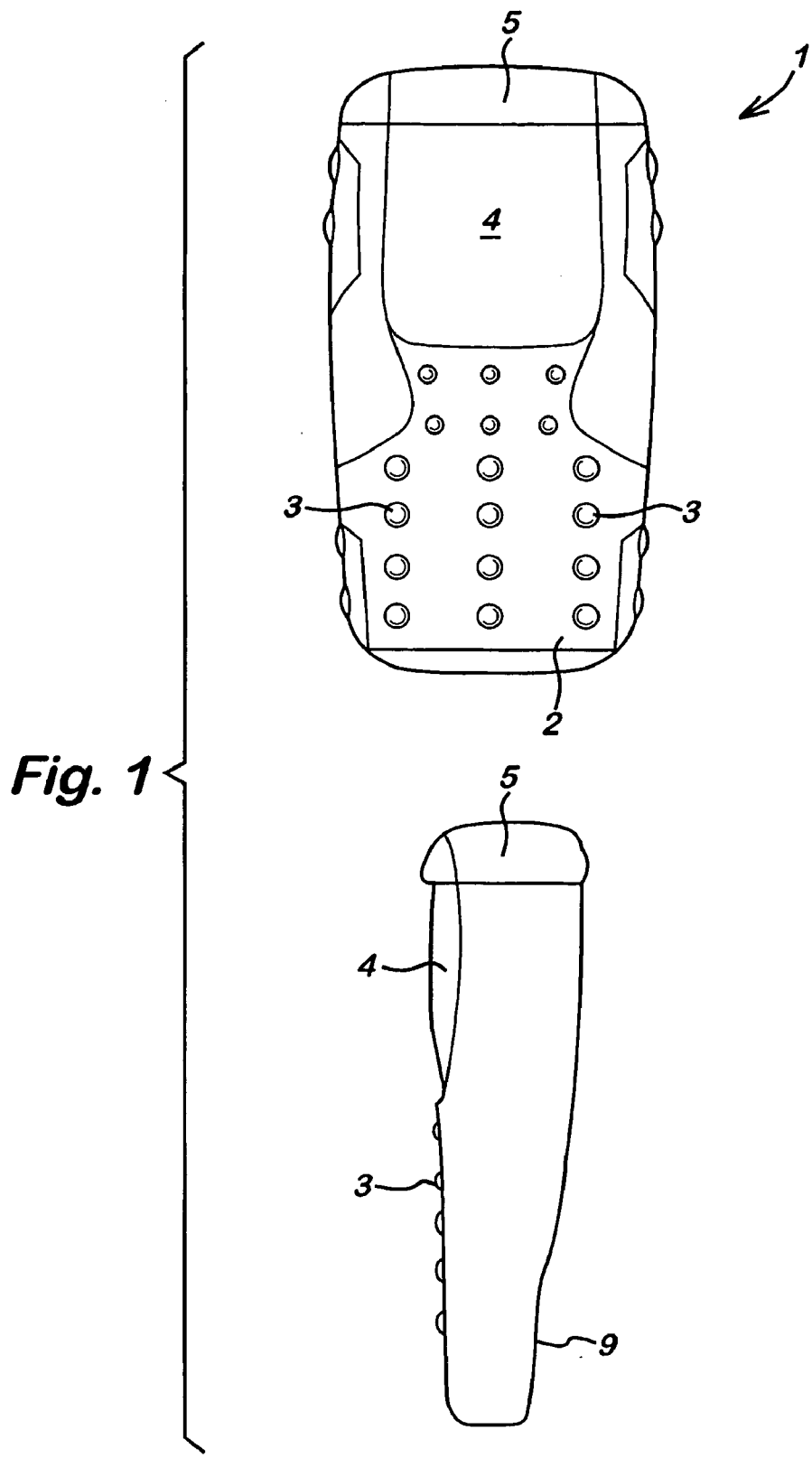
FIG. 1 shows a mobile station having a casing.

FIG. 1 illustrates a casing (2, 5) for a mobile station (1) according to an embodiment of the present invention. Instead of the conventional two casing shells being joined around the perimeter of the mobile station, the casing is formed predominantly as a single piece. The main piece of the casing effectively forms a sheath, or sleeve, for enclosing the engine of the mobile station. This 'one-piece' implementation does not require the conventional sealing edge around the perimeter of the major faces of the device. Therefore, in comparison to conventional casings, in which the seal is formed around a longer perimeter between front and rear casings, the casing has the capability of reducing the length of sealing edges, thereby reducing water ingress into the mobile station without the use of an expensive and complex gasket system.

In FIG. 1 it can be seen that the casing has two shells: the main piece 2 and a lid 5. The main piece 2 incorporates substantially all of the two major faces of the casing, substantially all of the two intermediate faces of the casing and one of the minor faces of the casing. These are interconnected in a water-tight manner to form a pocket that encloses an interior volume on five sides, into which the engine of the mobile station (including the functional electronic components of the phone) can be received. Preferably the faces that form main piece 2 are moulded together as a single component. The lid 5 incorporates the remaining minor face of the casing. The lid can be fitted in place over the opening of the main piece, preferably by snap-fitting into place over the opening by means of resilient latching portions on one of the main piece and the lid that can engage and latch on corresponding formations on the other of the main piece and the lid. As a result, the length of the gap through which water may penetrate is reduced in comparison to a conventional casing construction.

The lid may extend further down the device than illustrated in FIG. 1, or less far. The two parts of the casing could even be equally sized, although that may inconvenience operation of the device since the join between the casings may then intersect the user interface of the device.

The display window and plurality of keypads are preferably formed as an integral part of the casing, although they could be formed separately and fixed to the casing in a water-tight manner. As can be seen in FIG. 1, in a preferred embodiment the casing has a plurality of keypads (3) together constituting a keyboard, and a display window (4) formed into its surface. As the casing forms the display window for the device, it is necessary for the casing to be manufactured from a transparent material, which could be coloured/tinted. Therefore, decoration of the casing conveniently takes place after moulding.

To form the display window integrally with the casing it could be co-moulded with the casing. Thus the casing could be moulded so as to incorporate a pre-formed transparent sheet of material.

To form the plurality of keypads integrally with the casing they could be co-moulded with the casing. Thus the casing could be moulded so as to incorporate a pre-formed group of keypads or a keyboard structure including a plurality of keypads.

The plurality of keypads may be arranged such that, when the mobile station is assembled, the depression of the keypads by the user is sensed by sensing units (e.g. membrane dome switches) that form part of the body of the mobile station, and which are internal of the casing. The body of the mobile station is preferably the engine of the mobile station, but could also comprise an exterior casing surrounding the body which could hold the components of the engine (e.g. printed circuit board(s), display and connectors) together. The thickness of the wall of the casing could be chosen so that parts of the casing that are to serve as keypads are connected to the remainder of the piece of the casing of which they form part by walls that are sufficiently thin to permit those keypad parts to be moved relative to the remainder of that part of the casing piece. This may be done by suitable design of the mould that forms the casing piece. Alternatively, the body of the mobile station may be arranged to sense contact with, rather than movement of, the keypads. For example, a light emitter and a receiver on the body of the mobile station may be used to detect when the user has made contact with a keypad. In such an embodiment the receiver senses the light emitted from the emitter and detects any changes in the received signal caused by the finger of the user interrupting, reflecting or backscattering the transmitted light beam. Alternatively the casing itself could be sensitive to the keypads being touched or moved. For example, electrical contacts could be embedded within the casing and exposed at the keypads, so that the contact of the user's finger with a keypad is detected as a change in resistance or capacitance between the contacts exposed at that portion.

Forming the display window and plurality of keypads as an integral part of the casing has the further advantage that the display and plurality of keypads do not have to be manufactured in an additional process, or sourced from an additional supplier. Additionally, the number of seals and gaskets required is again reduced in comparison to conventional casings. Embodiments of the casings according to the present invention can therefore provide a relatively inexpensive set of mechanics for a mobile handset.

The casing can have an additional opening, to provide a DC connector for charging a battery of the mobile station. Alternatively a magnetic or inductive charging mechanism may be employed so that the mobile station can be powered and/or charged through the casing.

It is also envisaged that the water-proofing of the product could be further improved by the use of a membrane of a polymer or other material that is impermeable to water for casinging the microphone and loudspeaker. It is important that the material still allows sound to pass clearly between the microphone, the speaker and the user. One example of a suitable material is GoreTex(™). The membrane could be integral with one of the casing pieces but thinner-walled than the remainder of the casing.

Figure 2:
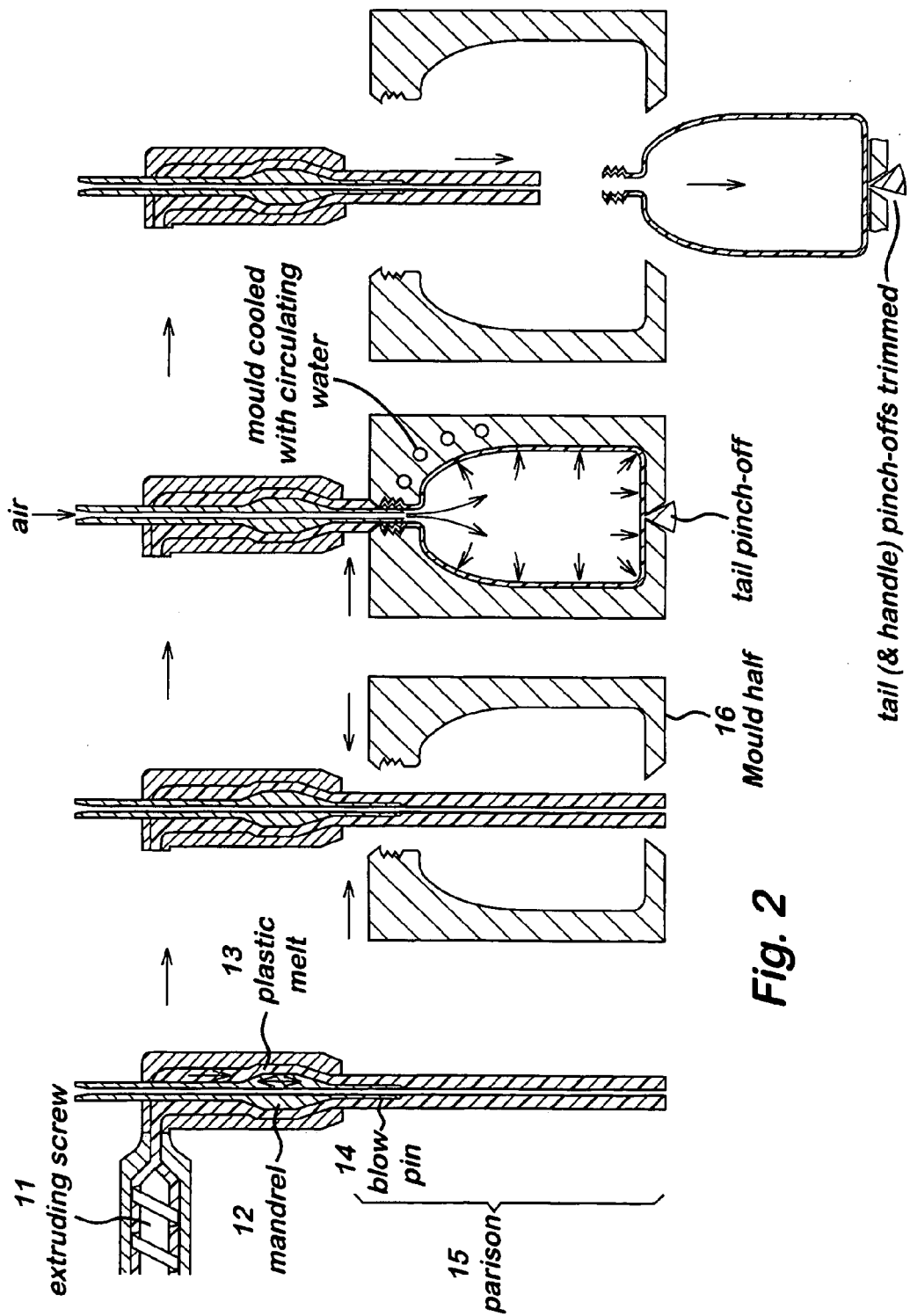
FIG. 2 shows a method of manufacturing a casing for an electronic device by blow-moulding.

The preferred method of manufacture of the casing is by blow-moulding (e.g. of parts 2 and 5). This is a well known method of manufacture that is used for high volume, low cost implementations such as drinks bottles. This method of manufacture is illustrated in FIG. 2 and consists of the following steps:

Step 1: plastic melt is forced by the extruding screw (11) into the die to make the parison (15). The parison (15) is a tube of soft extruded plastic.

Step 2: The mandrel (12) may move up and down so that the parison walls have areas of different thickness. As parts of the walls are stretched more than others, this gives walls of even thickness in the moulded bottle/casing.

Step 3: The parison is extruded downwards.

Step 4: The mould halves (16) move together, trapping the ends of the parison.

Step 5: The parison walls are welded together when pressed between the mould halves.

Step 6: Air is blown into the parison through the blow-pin (14), forcing the soft plastic outwards, closely against the wall of the mould.

Step 7: The mould cools the plastic, the mould halves move apart and the casing/bottle is ejected. Tail and handle pinch-offs are trimmed (and the material recycled).

Step 8: The next parison is being extruded for the next moulding cycle.

The external shape of the moulded article conforms to and is defined by the internal shape of the mould. Thus the internal shape of the mould can be selected to yield a desired external shape of the article. The walls of the article are typically of a uniform thickness, but the thickness can vary, as indicated above, in accordance with the degree of stretching of each region during the blowing operation and the amount of material deposited by the mandrel in each region.

This method of manufacture is relatively cheap and simple, and has not previously been used for providing mobile phone casings.

Alternatively, the casing could be formed by any other suitable technique, for example injection moulding. However, it will be noted that for some embodiments injection moulding would not be preferred as the mould tools required to form the interior undercuts and other configurations would be highly expensive, if not impossible to produce. Blow moulding is therefore particularly preferred and advantageous for forming casing parts that at least partially enclose a substantial volume (for instance part 2 of FIG. 1).

Where the casing is blow-moulded it could, as indicated above, be co-moulded, wherein a component or part is inserted into the mould prior to the injection of the material to be moulded, such that the initial component or part then becomes an integral part of the final moulded product. For example, it might be advantageous to include the window for the casing inside the mould prior to the principal moulding operation of the main portion of the casing, so that the window is thereby formed as an integral part of the casing via the principal moulding operation. The component or part which is inserted into the mould may itself have been formed by a moulding operation.

In one preferred arrangement the casing may be slit after its manufacture to facilitate insertion of one or more components of the device into the casing, or to permit such components to communicate with the space exterior to the casing. The slit may be formed in a step performed between steps 7 and 8 above. Such openings may be, for example, allow the insertion of microphones or speakers or may allow microphones or speakers to communicate with the space exterior to the casing. Alternatively, an opening may be formed to allow insertion of the engine into the casing. The casing may initially be formed as a sealed enclosure, That enclosure may be slit to provide an opening for insertion of the engine. The engine may be inserted and the enclosure may then be re-closed, preferably in a sealed manner. Such an opening is preferably formed around a relatively short circumferential path. For example, if the casing takes a generally cuboid shape, with one pair of opposite sides being substantially smaller in circumference than the other sides, the slit is preferably substantially parallel to those smaller sides. The slit need not pass fully around the casing. It could pass around enough of the casing to leave a hinge that allows the casing to be flexed to open the opening.

Figure 3A:
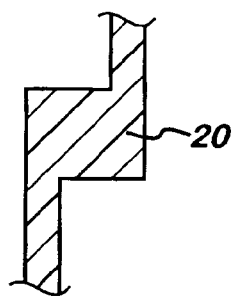
FIGS. 3a-c show a one-piece casing being split to form bevelled edges.
Figure 3B:
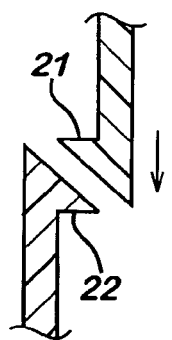
Figure 3C:
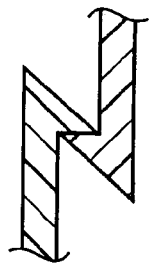
Figure 4:
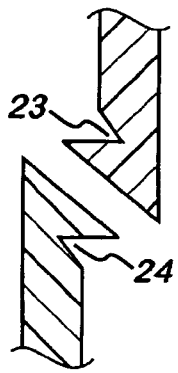
FIG. 4 shows a casing having improved sealing edges.
Figure 5A:
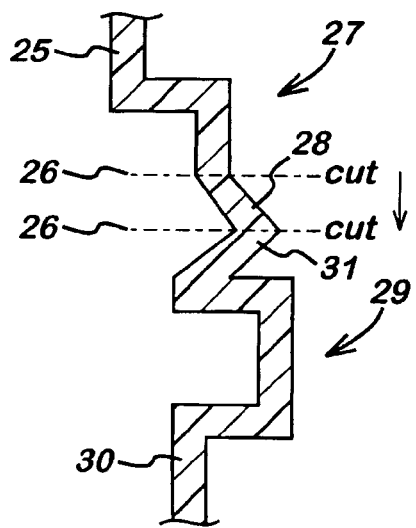
FIGS. 5a-b show a casing having protruding portions for engaging with dome key switches.

Examples of embodiments in which the casing is split after its manufacture are illustrated in FIGS. 3 to 5.

FIG. 3a to c show a cross-section through a part of a casing in one embodiment. The casing has been manufactured as illustrated in the cross-section of FIG. 3a, such that the walls of the casing have a thickened portion 20. This thickened portion preferably extends fully around the perimeter of the casing. The walls either side of the thickened portion are narrower and are offset from one another, as illustrated in FIG. 3a, such that the thickened portion extends away from the wall into the central cavity on one side and extends away from the wall in a direction external to the casing on the other. The casing is split into two shells after manufacture by making a cut through the thickened portion 20. Preferably, the cut is made at an angle to the casing walls, so that the edges of the slice are bevelled as illustrated in FIG. 3b. If the two shells are then pushed together so that the bevelled edges slide over each other, the two shells are connected and prevented from moving apart by means of the barrier formed by the abutment of the projecting side walls 21, 22 of the original thickened section. If the design is modified so that one or both portions of the casing are formed so as to provide cooperating recesses 23 for receiving the protruding portion 24 of the other casing portion (as illustrated in FIG. 4), then the connection between the two casing portions has an improved resistance to water ingress due to the increase in surface area over which the two shells make contact when interengaged. Thus, the casing can be moulded as a unitary component that constitutes a preform of the cover and has features that, once parts of the casing each carrying at least one such feature have been separated from each other, may be interlocked.

Figure 5B:
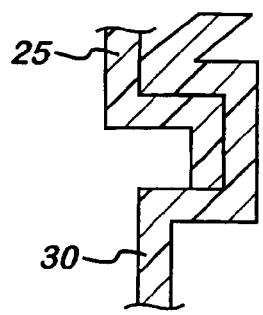

FIG. 5 shows a further embodiment. In this embodiment the wall 25 is cut circumferentially as shown at 26. This yields a first shell 27 having an inwardly directed projecting wall 28 and a second shell 29 having an outwardly directed projecting wall 30 from which a ramp wall 31 extends internally at an oblique angle. The two shells can then be mated with each other so that the wall 28 rides over the ramp wall 31 until it snaps into place behind the wall 30. (See FIG. 5b). In that configuration the walls 28 and 30 bear against each other so as to resist withdrawal of one shell from the other, locking the shells in interengagement. This formation could, for example, be used for the interengagement of the shells 2 and 5 of FIG. 1. Compared to the design of FIG. 3, this design has the advantage that the walls are of a substantially constant thickness and are therefore more readily formed by blow-moulding.

The above examples are intended for illustration only. It should be understood that many designs can result by applying the above design concepts.

Figure 6A:
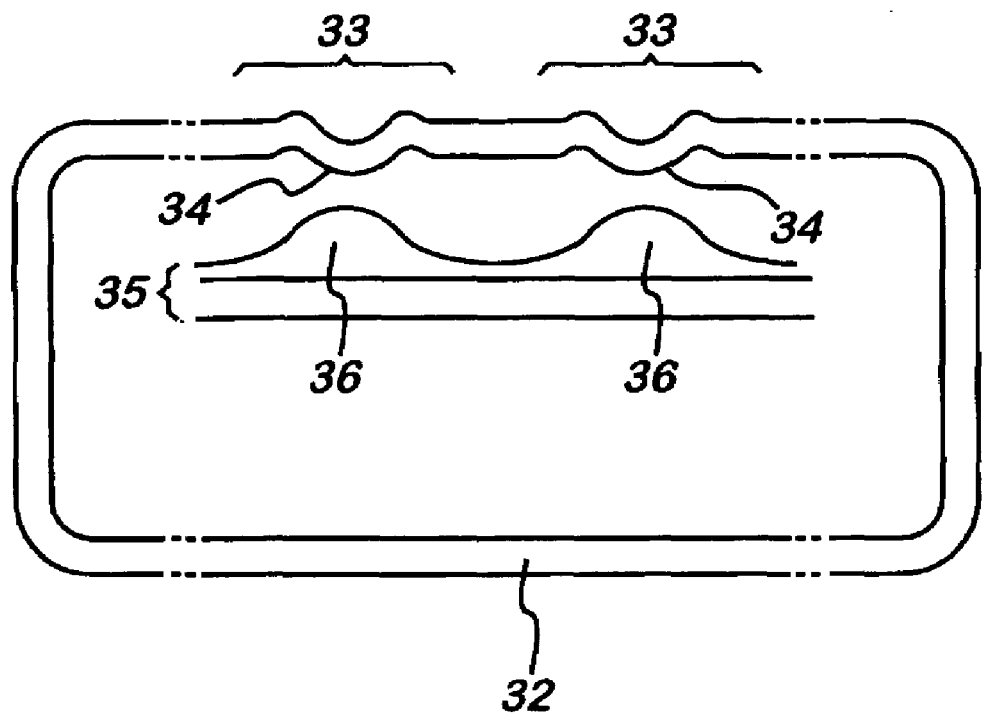
FIG. 6a illustrates an embodiment having protrusions that protrude into the interior cavity of the casing.
Figure 6B:
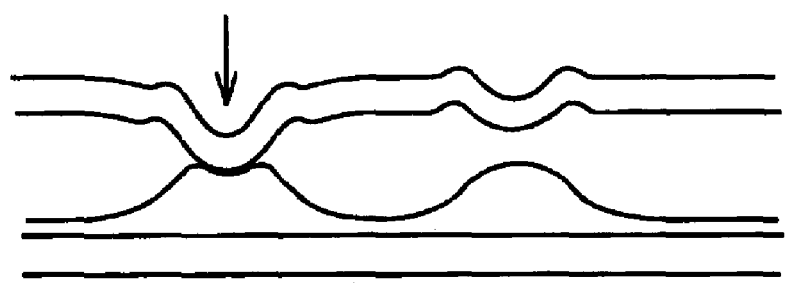
FIG. 6b illustrates the embodiment shown in FIG. 6a having one of the protrusions moved inward to press on one of the key switches.

In addition to the features described above, it is advantageous if the casing can be manufactured so as to comprise further portions that project from the body of the casing into the internal cavity. An illustration is given in FIG. 6a and b. The projecting portions of the casing allow keypads to be formed as integral parts of the casing. The casing 32 includes flexible zones 33, each of which has a protrusion 34 on its inner surface. The flexible zones represent keys, and the flexible zones and the protrusions are located so as to be capable of bearing on dome key switches 36 of a switch mat 35 of the device within the casing. When the device is within the casing the zones can be pressed inwardly and the respective projecting portions are moved downwards so as to interact with the dome key switches as illustrated in FIG. 6b.

From the above description, it can be seen that the casing according to some embodiments of the present invention can advantageously comprise formations that protrude into the interior cavity of the casing. Examples include wall 28 of FIG. 5 and protrusions 34 of FIG. 6. A casing having such protruding portions is preferably manufactured by a process of blow-moulding, as described above since if such a casing were to be formed by injection moulding extremely complex tooling would be required to permit the protruding portions to be formed and the moulded article to be separated from the mould.

Preferred materials for the casing include polycarbonate, clarified polypropylene, polyester and thermoplastic polyurethane. However, the casing and its method of manufacture should not be considered as being limited to any particular material.

It is envisaged that this casing could be fitted to the mobile station during manufacture, or alternatively, sold as an enhancement to be fitted by the consumer at a later date.

Where the casing is formed as a two-part enclosure comprising a pocket and a lid, as shown in FIG. 1, the lid could be separate from the main part of the casing or could be attached to it, e.g. by a hinge or an integral strap. The presence of a hinge between the two shells of the casing would further reduce the length of the gap through which water might seep. The hinge would preferably be located on one of the major faces of the casing. Instead of completely separating the lid from the main part of the casing, a partial cut could be made, leaving a flexible web between the main part of the casing and the lid, thereby forming a hinge between the main part and the lid.

There may be one or more gaskets or other sealing means such as filler, resin or interpenetrating walls at the join between the parts of the casing. Thus, in one arrangement one of the parts of the casing has at its periphery where it joins the other of the parts of the casing a wall defining a channel for receiving a gasket, for example of rubber or silicone. The other part of the housing has a formation shaped to engage the gasket around the full periphery of the join and to be pressed into place against the gasket when the two parts of the housing are attached to each other. In another arrangement one of the parts has at its periphery where it joins the other of the parts of the casing a wall defining a channel for snugly receiving an interpenetrating sealing wall of the other part of the housing, in such a way that the two seal together. The parts of the casing could be welded together or sealed with a sealant such as adhesive or tape.

When the engine of the mobile device is to be inserted into the housing, internal key switches (e.g. dome switches) on the engine may have to meet with actuation parts (e.g. keypads) on the housing. As the mobile device (e.g. in the arrangement of FIG. 1) must be slid into a part of the housing it is preferred that the portion of the casing having the plurality of keypads slopes so as to obliquely face the opening in that part of the housing. (see FIG. 1 at 9). This reduces the need for the internal key switches to slide over the membrane keys.

The lid piece of the casing could be integral with the engine of the portable device, or another part of the device that is to be received in the casing. In this way the attachment of the lid piece to the major piece of the casing could be accomplished in the same operation as the insertion of that part of the device into the major piece of the casing.

The mobile station could be any suitable form of device, preferably an electronic device. Examples include portable stereos, mobile phones and calculators.

After step 8 of the blow moulding process as detailed above, the moulded article typically has a hole where the blow pin has passed into the article and through which the article has been blown. To seal the casing this hole can be pinched shut, for instance by hot jaws. The hole is conveniently located at a corner of the casing. Alternatively, when the casing is closed around the engine the hole may be filled by a connector or another component for communication between the interior and exterior of the casing.

The applicant hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. The applicant indicates that aspects of the present invention may consist of any such feature or combination of features. In view of the foregoing description it will be evident to a person skilled in the art that various modifications may be made within the scope of the invention.

The invention claimed is:

1. A mobile electronic device casing comprising at least two inter-engageable shells formed by splitting a unitary blow moulded article, the shells comprising complementary inter-engageable formations configured to allow the shells to be sealably inter-engaged with respect to one another to, when interengaged, define an interior volume for housing a mobile electronic device, the interior volume formed from the interior volume defined by the un-slit unitary article, and wherein the inter-engaging formations are configured to be formed from features produced in the blow moulding process.

2. A casing as claimed in claim 1, wherein at least one of the shells have one or more keys integral with the shell for actuation of a user-input interface of a housed mobile electronic device, and at least one of the shells have a window integral with the shell for permitting a display of a housed mobile electronic device to be viewed through the casing.

3. A casing as claimed in claim 1, comprising one or more keys for touch-sensitive actuation of an input interface of a housed device.

4. A casing as claimed in claim 1, wherein the one or more keys are configured to be user-movable with respect to the remainder of the shell to provide user-actuation of one or more corresponding keys of a mobile electronic device housed within the casing.

5. A casing as claimed in claim 1, wherein at least one shell of the casing has the form of a sheath capable of encasing substantially all of the two major faces of the mobile electronic device.

6. A casing as claimed in claim 1, wherein the casing is elongate about an axis and the shells are configured so as to be sealably interconnectable at an interface substantially perpendicular to that axis.

7. A casing as claimed in claim 1, the casing is elongate about an axis and comprises three shells, the shells being configured so that one of the shells may be sealably interconnected to both of the other shells at respective interfaces substantially perpendicular to the said axis.

8. A casing as claimed in claim 1, wherein at least one shell of the casing forms a lid portion for enclosing substantially all of a minor face of a device housed within the casing.

9. A casing as claimed in claim 1, wherein at least one pair of shells is connected by means of a hinge.

10. A casing as claimed in claim 1, wherein at least one of the shells comprises a gasket whereby the shells may be sealedly connected.

11. A casing as claimed in claim 1, wherein the keys are connected to the remainder of the shell by flexible webs permitting relative movement between the keys and the remainder of the shell.

12. A casing as claimed in claim 1, wherein each shell is impermeable to water.

13. A casing as claimed in claim 1, wherein the casing does not comprise any electrical components, the electrical components being provided by a mobile electronic device housed in the casing.

14. A casing as claimed in claim 1, wherein the display is configurable under the control of a controller to present to a user of the mobile electronic device information concerning the status of the mobile electronic device.

15. A casing as claimed in claim 1, wherein the casing is cooperatively configured to the engine of the mobile electronic device, such that the casing can hold the mobile electronic device in a fixed location relative to the casing when the mobile electronic device is inserted into the casing with the plurality of keypads lying adjacent to respective portions of the user-actuable input interface when the mobile electronic device is enclosed within the casing.

16. A casing as claimed in claim 1, wherein the casing has an opening for providing electrical connection to a device housed therein, the opening being formed from a blow hole of the blow moulding process.

17. A casing as claimed in claim 1, wherein the mobile electronic device is such as to be capable of being charged by means of a field passing through the body of the casing.

18. A casing as claimed in claim 1, wherein the mobile electronic device is a mobile telecommunication device.

19. A casing as claimed in claim 1, wherein the mobile electronic device is a mobile telephone.

20. A casing as claimed in claim 1, having the said mobile electronic device inserted therein.

21. A casing as claimed in claim 1, wherein the casing is a casing suitable for enclosing a mobile electronic device engine.

22. A casing as claimed in claim 1 wherein the shells are comprised of walls having a substantially uniform thickness and protruding portions, at least some of said protruding portions projecting from the walls into the interior volume.

23. A casing as claimed in claim 22, wherein at least some of the protruding portions of the casing are arranged for actuation of a user-actuable input interface of the mobile electronic device.

24. A casing as claimed in claim 23, wherein the shells can be snap fastened together by means of the inter-engagement of at least one of the protruding portions of one shell with a corresponding formation on the other shell.

25. A mobile electronic device casing as claimed in claim 1 having a mobile electronic device housed in the casing.

26. A method for forming a mobile electronic device casing, the method comprising forming the casing by blow moulding to provide a unitary blow-moulded article enclosing an interior volume, slitting the unitary article to provide at least two inter-engaging shells configured to be sealably interconnectable with each other so as to enclose an interior volume for receiving the mobile electronic device, the enclosed interior volume of the inter-engaging shells formed from the enclosed interior volume of the unitary moulded article.

27. A method as claimed in claim 26, wherein the step of forming the casing comprises forming the casing by extrusion blow moulding.

28. A method as claimed in claim 26, wherein the step of forming the casing comprises forming the casing by injection blow moulding.

29. A method as claimed in claim 26, further comprising:
slitting the casing to form an opening therein;
inserting the mobile electronic device through the opening; and
closing the opening.

30. A method as claimed in claim 29, wherein the step of slitting the casing comprises slitting the casing into two separate shells.

31. A method as claimed in claim 29, wherein the step of slitting the unitary article comprises slitting the article into two shells that are joined by a web of material integral with the shells that constitutes a hinge, whereby one shell may be hinged relative to the other.

32. A method as claimed in claim 29, wherein forming the casing comprises providing a mould to form the casing such that the casing is elongate about an axis and the slit is substantially perpendicular to that axis.

33. A method as claimed in claim 26, wherein the step of forming the casing comprises forming the casing such that it comprises one or more protrusions that extend into the interior of the casing.

34. A method as claimed in claim 33, wherein forming the casing comprises providing a mould to form the casing such that the casing comprises a plurality of keys integral with the casing for actuation of a user input interface of a housed device, and wherein the keys formed by the mould protrude into the interior of the device for engaging the user interface of a housed device.

35. A method as claimed in claim 26, wherein forming the casing comprises providing a mould such that the casing is formed as a unitary component, having features that, once the unitary article is split into respective shells, provide each shell with at least one interlockable complementary formation to allow sealable inter-engagement of the respective shells.

36. A method as claimed in claim 35, wherein the respective interlockable complementary formations are configured to be snap fastened together by a first interlocking formation on at least a first wall of a first shells that extends into the interior of the casing, and by a second interlocking formation on at least a second wall of another of the shells that extends towards the exterior of the casing, the respective interlockable formations, when engaged, being configured to resist detachment of the shells from one another.

37. A method as claimed in claim 36, wherein forming the casing comprises providing a mould to form the casing such that at least one of the interlockable formations of the shells comprises a wall sloped so as to abut with a complementary wall on the other shell to cause the shell walls to slide past one another until the interlocking formations are engaged.

38. A mobile electronic device casing article, the article formed by the method of claim 24.

39. A mould for use in the method of claim 26.

40. A method as claimed in claim 26, further comprising housing a mobile electronic device in the casing.

* * * * *